[54] FOUR ELEMENT LENS SYSTEM

[75] Inventors: Kunihiko Konoma, Sakai, Japan; Kaname Satou, Torrance, Calif.

[73] Assignee: Minolta Camera Kabushiki Kaisha, Osaka, Japan

[22] Filed: May 2, 1975

[21] Appl. No.: 573,869

[30] Foreign Application Priority Data

July 11, 1974 Japan .............................. 49-79900

[52] U.S. Cl. .............................. 350/209; 350/221
[51] Int. Cl.$^2$ .............................. G02B 9/36
[58] Field of Search .......... 350/209, 221, 189, 207, 350/208, 210

[56] References Cited
UNITED STATES PATENTS

| | | | |
|---|---|---|---|
| 3,507,560 | 4/1970 | Baker | 350/221 |
| 3,762,801 | 10/1973 | Baker | 350/189 |
| 3,807,836 | 4/1974 | Baker | 350/221 |

*Primary Examiner*—John K. Corbin
*Assistant Examiner*—Conrad Clark
*Attorney, Agent, or Firm*—Jackson & Jones Law Corporation

[57] ABSTRACT

A four element lens system for use on a camera and the like comprises two positive meniscus lens having two negative meniscus lens interposed between the positive lens. The optical axis of each lens elements being aligned with an aperture stopper element or its functional equivalent between the negative lens elements. The position of the effective plane of the aperture stopper satisfying the following equation:

$$1.0 \geq \frac{S_2'' - S_2'}{S_2'' + S_2'} > 0.1$$

wherein S is a distance along the optical axis between lens elements, $S'_2$, is the distance between the surface of the second negative meniscus lens and the effective plane of the aperture stopper and $S''_2$ is the distance between the effective plane of the aperture stopper and the surface of the third negative meniscus lens. Preferably each of the lens elements is injection molded from a plastic material with both of the positive lens elements and the negative lens elements being identical lens. As a result of the present invention, an image may be formed having relative low aberration from a portrait distance to a landscape distance in a camera that requires only the manufacture of two types of plastic lenses.

32 Claims, 9 Drawing Figures

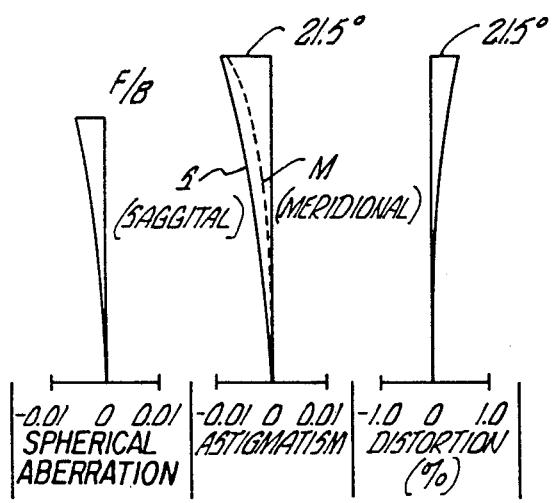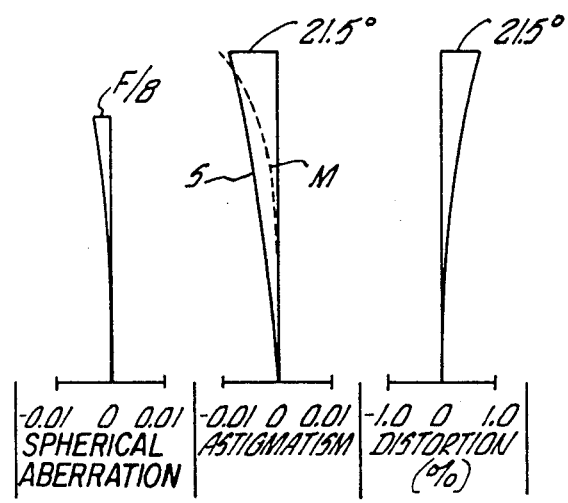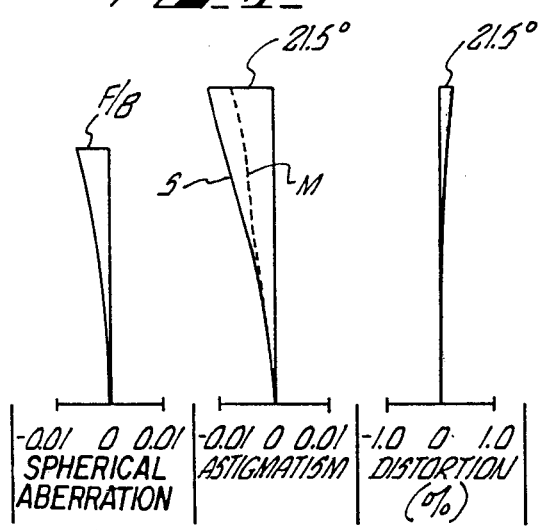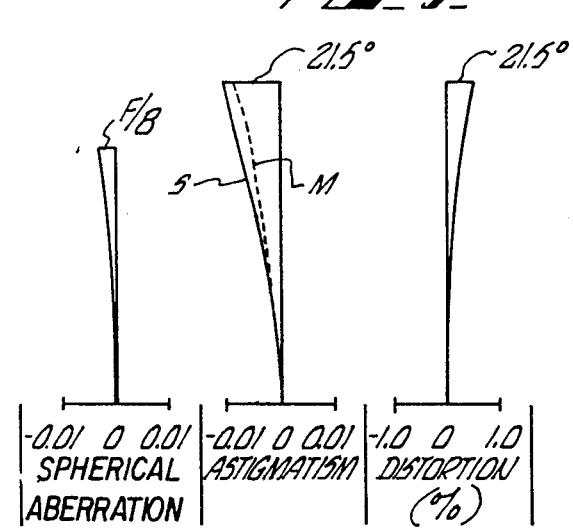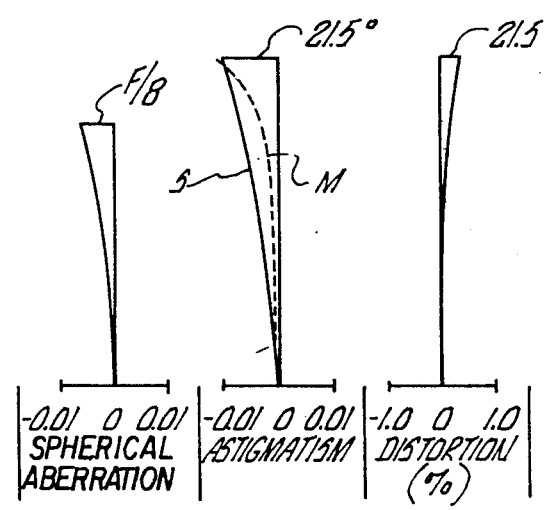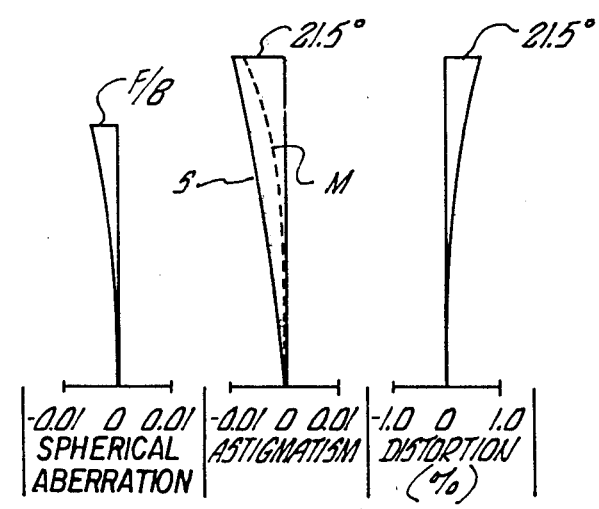

FOUR ELEMENT LENS SYSTEM

BACKGROUND OF THE INVENTION

1. Field of the Invention

The present invention relates to improvements in optical lens systems providing a real image. In particular, the present invention relates to improvements in providing an optical lens design utilizing duplicate lens component parts for the low cost production of cameras.

2. Description of the Prior Art

Photographic objectives are presently known in the field of low cost cameras. For example, the Altman U.S. Pat. No. 3,194,116 and the Melech U.S. Pat. No. 3,438,697 disclose photographic objectives of the simple triplet type. This lens system has the advantage of providing relatively good correction for aberrations and is frequently referred to as the Cooke triplet. The Altman patent in particular discloses the value from a cost view point of utilizing lens elements made entirely of injection molded plastics. Both of these patents are dependent upon an inner negative biconcave lens element having a relatively thin thickness along the optical axis to permit achromatizing of the entire lens system.

Plastic lens systems utilizing more than three elements are also known in the prior art such as the Willoughby et al U.S. Pat. No. 3,749,477. This reference simply discloses an anamorphic lens system having four lenses made from the same plastic and adapted to be attached as a supplement to a fixed lens camera.

Finally, a glass projection lens system having a 1:1 magnification is disclosed in the McCrobie U.S. Pat. No. 3,817,599. The McCrobie lens system is designed to provide a multi-focal projection lens wherein the basic lens group has a symmetrical conjugate relationship. Basically, the prior art has experienced some limited success in providing low cost cameras with plastic lens. However, manufacturing problems have existed for instance in the injection molding of thin biconcave negative lenses.

SUMMARY OF THE INVENTION

The present invention provides a novel lens system embodying a number of features which insure a real image that is adequately corrected for chromatic aberrations, spherical abberations, coma, and astigmatism and which has a substantially flat image field. The lens system is easily assembled at a low cost in a camera.

The lens system comprises four fixed lens elements comprising a first positive lens element, a second negative lens element, a third negative lens element and a fourth positive lens element. The first and second lens elements having a conjugate relationship to the third and fourth lens elements. An aperture stopper element or its functional equivalent is utilized to create an effective plane between the second and third negative lens elements. The position of the effective plane of the aperture stopper satisfies the following equation:

$$1.0 \geq \frac{S_2'' - S_2'}{S_2'' + S_2'} > 0.1$$

wherein S is the distance between the elements along the optical axis and $S_2'$ is the distance between the surface of the second negative lens and the effective plane of the aperture stopper and $S_2''$ is the distance between the effective plane of the aperture stopper and the surface of the third negative lens.

In a preferred embodiment, each of the lenses are a meniscus element with the positive lens elements made from methyl methacrylate and the negative lens elements made from a copolymer of polystyrene and methyl methacrylate. The first and fourth lenses and the second and third lenses have respectively identical optical lens characteristics and can be manufactured from a pair of injection molds. The focal length of the first positive lens element, $f_1$, can be related to the focal length of the second negative lens element, $f_2$, as follows:

$$1.3 f_1 \geq |f_2|$$

The lens thickness along the optical axis of the first positive lens element, $t_1$, can be related to the thickness of the second negative lens element, $t_2$, as follows:

$$t_1 \geq 2 t_2$$

The lesser radius of curvature on the first positive lens element $r_1$, can be related to the greater radius of curvature on the second negative lens element, $r_3$, as follows:

$$r_1 \leq r_3$$

The features of the present invention which are believed to be novel are set forth with particularity in the appended Claims. The present invention, both as to its organization and manner of operation, together with further objects and advantages thereof, maybe best understood by reference to the following description, taken in conjunction with the accompanying drawings.

BRIEF DESCRIPTION OF THE DRAWINGS

FIG. 2 discloses a graph of the aberration tolerances of example 1.

FIG. 3 discloses a graph of the aberration tolerances of example 2.

FIG. 4 discloses a graph of the aberration tolerances of example 3.

FIG. 5 discloses a graph of the aberration tolerances of example 4.

FIG. 6 discloses a graph of the aberration tolerances of example 5.

FIG. 7 discloses a graph of the aberration tolerances of example 6.

DESCRIPTION OF THE PREFERRED EMBODIMENT

The following description is provided to enable any person skilled in the optical design art to make and use the invention and it sets forth the best mode contemplated by the inventors of carrying out their invention. Various modifications, however, will remain readily apparent to those skilled in the art, since the generic principles of the present invention have been defined herein specifically to provide a relatively economical and easily assembled lens system.

Subsequent to the advent of fast electronic computers, the field of optical designing has been revolutionized and it is now possible to perform comprehensive image analysis in a relatively short time. The derivation of the formulae and relationships set forth herein have been accomplished with the assistance of a computer. The present invention represents the parameters of a compromised balance of acceptable aberrations in a relatively easily manufactured and low cost lens system for utilization in a camera. For a reference to the techniques of computer design, which are not necessary for either an understanding or the practice of the present invention, the reader is directed to "LENS ABERRATION DATA" by J. M. Palmer, American Elsevier Publishing Co., Inc., 1971 and "OPTIMIZATION TECHNIQUES IN LENS DESIGN" by T. M. Jamieson, American Elsevier Publishing Co. Inc. 1971. In addition, reference is made to "GEOMETRICAL OPTICS" by L. C. Martin, Pitman & Sons Ltd. 1955. These references are incorporated herein, simply as supplementing the present disclosure.

The present invention includes two pairs of meniscus lens elements in a conjugated relationship. Each pair of lens comprises a positive and negative lens element. The lens arrangements are a mirror image of each other, that is, viewing the lens elements sequentially from the object side of the lens system to the image side, the first positive meniscus lens element will have a convex surface towards the object, while the second negative meniscus lens will also have a convex surface towards the object. Both the third negative meniscus lens and the fourth positive meniscus lens will have convex surfaces towards the image plane.

Figure 1:
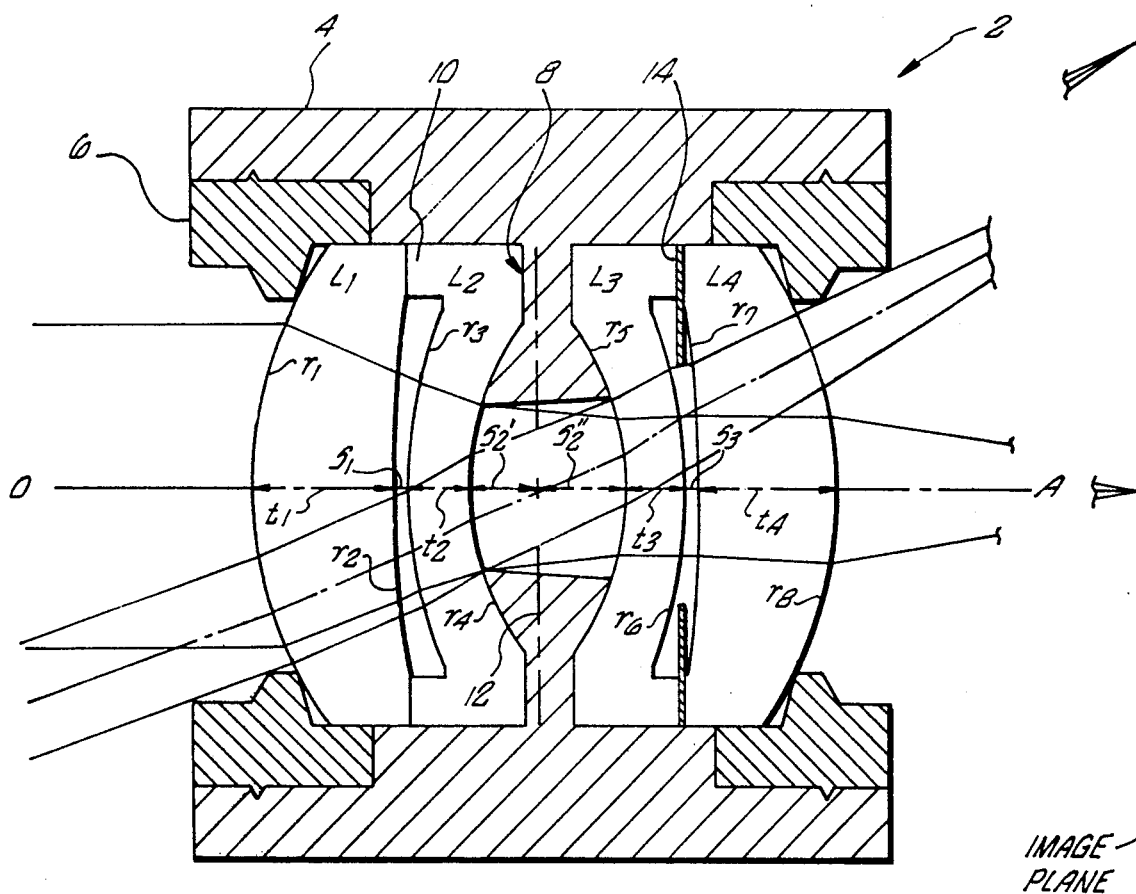
FIG. 1, is a schematic cross sectional view of a conjugate lens system embodying the present invention.
Figure 9:
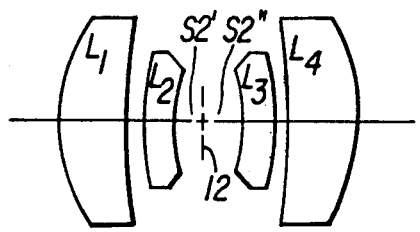
FIG. 9 is a schematic view of the lens system embodying the present invention.
Figure 8:
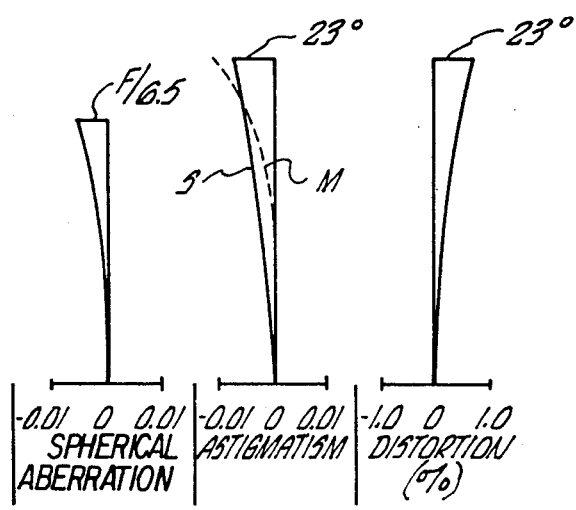
FIG. 8 discloses a graph of the aberration tolerances of example 7.

In the present lens system the positioning of the effective plane of the aperture stopper or an effective equivalent of the aperture stopper is important in correcting coma and chromatic aberrations for permitting an acceptable photographic image from infinity to a portait distance. The position of the aperture stopper or its functional equivalent, can be seen with reference to FIG. 1 and FIG. 9. A schematic aperture stop 12 as shown in FIG. 8 and in trace lines in FIG. 1. The actual aperture stopper element in the commercial embodiment of FIG. 1 is physically formed by both the object and image side edges of the lens mounting shoulder 8 to define the intersection point of the maximum field angle principle rays with the optical axis. That is, the lower object side edge and the upper image side edge of the mounting shoulder 8 defines the position of the maximum field principle ray as schematically shown in FIG. 1. The same intersection point for the other maximum field angle principle rays are similarly defined by a simple rotation about the annular shoulder edges. The effective plane of the aperture stopper can be further defined as a plane extending normal to the optical axis and containing the junction or intersection point of the maximum field angle principle rays with the optical axis.

Referring to FIG. 1, the four element lens system 2 of the present invention is disclosed. A lens barrel 4 has been appropriately molded or machined to accommodate the desired spacings and mounting of the lens elements of the present invention. A first positive meniscus lens of element, $L_1$ having a pair of convex surfaces directed towards the object is held in place by an appropriate locking ring 6. A second negative meniscus lens element, $L_2$, is appropriately mounted within the lens barrel 4 to bear against an annular alignment step or shoulder 8 for ease of assembly. In one advantageous embodiment of the invention, the second lens, $L_2$, if made of plastic, can have an intrinsically molded peripheral spacer portion 10 to appropriately seat and align the outside positive meniscus lens, $L_1$. As can be readily appreciated by those skilled in the plastic molding art, either lens $L_1$ or $L_2$ can be molded with the peripheral spacer. A shim or spacer 14, preferably colored a flat black, can be used to adjust or compensate for any desired spacing between the respective lenses. The relative size of the aperture of the spacer 14 can be dimensioned to eliminate any undesired flare.

A third negative meniscus lens element, $L_3$, can be the identical molded lens as the second negative lens element, $L_2$. Lens element, $L_3$, will accordingly have an integral peripheral spacer 10 for spacing a lens element, $L_4$. The convex surface of $L_3$ will be directed towards the image plane of the lens system. The fourth positive meniscus lens element, $L_4$, will be identical to the first positive meniscus lens element, $L_1$. Lens, $L_4$, will have its convex surface also directed towards the image plane.

The thickness of each lens element as measured along the optical axis of the lens system, OA, is appropriately designated as t with the subscript numbers referring to a specific lens element sequentially from the object side of the lens system to the image side. Likewise, the spacer distances along the optical axis are set forth as $S_1$, the distance between the lens $L_1$ and $L_2$. The distance between the image side surface of the second negative meniscus lens, $L_2$, and the effective plane of the aperture stopper 12 or its functional equivalent traversed to the optical axis, OA, is denoted as $S_2'$. The distance between the effective plane of the aperture stopper 12 and the surface of the third meniscus lens, $L_3$, is $S_2''$. The total distance between lens $L_2$ and $L_3$ is $S_2$. Finally, the distance between the adjacent surfaces of lens, $L_3$ and $L_4$, is set forth as $S_3$. The radii of curvature of the lens surface uses the symbol r with the sub numbers referring to the individual radius of curvatures of the respective lens surfaces sequentially from the object side to the image side of the lens system.

To maximize the advantages of the present invention in low cost cameras, the preferred embodiment will utilize injection molded optical plastics for each of the lens elements. Some of the plastics which could be utilized are methacrylate (Nd 1.492, V 57.4) and polystyrene (Nd 1.591, V 30.8), polycarbonate (Nd 1.586, V 34.8) and polysulfone (Nd 1.633).

In the preferred embodiment the negative meniscus lens system $L_2$ and $L_3$, can be molded from a methyl methacrylate and styrene copolymer having an index of refraction Nd of 1.57 and an Abbe index of dispersion, V of 34.6. The positive meniscus lens systems $L_1$ and $L_4$ can be molded from acrylic (Nd 1.492, V 57.4). The use of plastics are highly advantageous with respect to the cost of material and the elimination of grinding or finishing steps required in conventional optical glass. Further the use of plastic permits the integral molding of peripheral spacers on one of the lens elements for positioning the other lens element. Plastic is particularly advantageous in the lens design of the present invention in that the lens dimensions are capable of being manufactured with relatively high quality. Further, due to the relative dimensions of the negative lens elements $L_2$ and $L_3$, of the present invention, as compared to the double concave lens elements used in the conventional Cooke triplet lens system, pressure stresses that are developed during the molding are not a problem and birefringence stress rings are not produced. That is, the thinness of the meniscus lens of the present invention eliminates conventional optical problems that can occur with molding. The manufacture of the present four element lens system can be accomplished with only a production cost of two separate molds, since the lens elements are duplicated in the assembled conjugate four element lens system. The use however, of a symmetrical conjugate lens system in the present invention requires the aperture stopper 12 or its functional equivalent to be positioned in accordance with the following derived formula:

$$1.0 \geq \frac{S_2'' - S_2'}{S_2'' + S_2'} > 0.1 \quad (1)$$

By adhering to formula (1) it is possible to adequately correct coma flare and color aberrations that would result from a completely symmetrical conjugate lens system.

The above formula (1) establishes the junction of the principle rays defining the maximum field angle with the optical axis, OA, as shown in FIG. 1.

In addition, any further color aberrations and spherical aberrations along with astigmatism and the flatness of the image field can be compensated for by arranging the focal length of the positive meniscus lens element $L_1$ and $L_4$ to have the following relationship to the focal length of the negative meniscus lens elements $L_2$ and $L_3$ wherein $f_1$ is the focal length of the positive lens elements and $f_2$ is the focal length of the negative lens elements:

$$1.3 f_1 \geq |f_2|$$

The spherical aberrations can be further minimized by requiring that the absolute value of the radii of curvature $r_1$ and $r_8$ of the lesser radius of lens elements $L_1$ and $L_4$, should bear the following relationship to the absolute value of the radii of curvature of the larger radius of curvature $r_3$ and $r_6$ of the lens elements $L_2$ and $L_3$, in accordance with the following equation:

$$r_1 \leq r_3 \quad (3)$$

$$|r_8| \leq |r_6| \quad (4)$$

Finally, the color aberrations on the axis and an economical and practical size of the lens diameters and length of the lens systems can be appropriately maintained by having the thickness, t, of the positive lens elements $L_1$ and $L_4$ greater than or equal to twice the thickness of the lens thickness of $L_2$ and $L_3$. This can be seen in the following equations:

$$t_1 \geq 2t_2 \quad (5)$$

$$t_4 \geq 2t_3 \quad (6)$$

An an alternative embodiment of the present invention, the first lens element $L_1$, can be made from an appropriately indexed glass to take advantage of the higher resistance of glass to abrasion and static electricity. In addition, a glass lens is easier to coat, because of its higher melting point and accordingly anti-reflective coatings and/or ultra violet coatings can be utilized much more readily on the glass surface. If anti-reflection is a problem in the application of the present plastic lenses, it is possible to utilize a magnesium fluoride coating that can be applied by vacuum deposition.

The parameters of the lens elements of the present invention are listed in the following examples, wherein Nd is the refractive index of the individual spectrum and V is the index of dispersion or Abbe number. The thicknesses of the lens and the spacing between the lens are respectively t and S. A negative sign indicates the radii on centers of curvature lying on the object side of their vertices. In each of the following examples $f = 1.0$, 1:8 and the maximum field angle is 43°.

EXAMPLE 1

| LENS | Nd | V | RADII | THICKNESS (t) AND SPACINGS (S) |
|---|---|---|---|---|
| $L_1$ | 1.491 | 57.8 | $r_1 = 0.2412$<br>$r_2 = 1.5112$ | $t_1 = 0.089$ |
| | | | | $S_1 = 0.006$ |
| $L_2$ | 1.568 | 34.6 | $r_3 = 0.3117$<br>$r_4 = 0.1680$ | $t_2 = 0.036$ |
| | | | | $S_2' = 0.036$<br>$S_2'' = 0.051$ |
| $L_3$ | 1.568 | 34.6 | $r_5 = -0.1680$<br>$r_6 = -0.3117$ | $t_3 = 0.036$ |
| | | | | $S_3 = 0.006$ |
| $L_4$ | 1.491 | 57.8 | $r_7 = -1.5112$<br>$r_8 = -0.2412$ | $t_4 = 0.089$ |

Reference is made to FIG. 2 to disclose graphically the aspheric, astigmatism and distortion aberration resulting from the lens system of Example 1. As can be readily appreciated by those skilled in the field of photography, these distortions are well within acceptable limits for photographs from infinity to portrait images. FIGS. 3 through 7 correspond to the aberration values respectively of Examples 2 through 6.

EXAMPLE 2

| LENS | Nd | V | RADII | THICKNESS (t) AND SPACINGS (S) |
|---|---|---|---|---|
| $L_1$ | 1.491 | 57.8 | $r_1 = 0.2464$<br>$r_2 = 1.6087$ | $t_1 = 0.089$ |
| | | | | $S_1 = 0.014$ |
| $L_2$ | 1.568 | 34.6 | $r_3 = 0.3042$<br>$r_4 = 0.1661$ | $t_2 = 0.038$ |
| | | | | $S_2' = 0.036$<br>$S_2'' = 0.051$ |
| $L_3$ | 1.568 | 34.6 | $r_5 = -0.1661$<br>$r_6 = -0.3042$ | $t_3 = 0.038$ |
| | | | | $S_3 = 0.009$ |
| $L_4$ | 1.491 | 57.8 | $r_7 = -1.6087$<br>$r_8 = -0.2464$ | $t_4 = 0.089$ |

EXAMPLE 3

| LENS | Nd | V | RADII | THICKNESS (t) AND SPACINGS (S) |
|---|---|---|---|---|
| $L_1$ | 1.491 | 57.8 | $r_1 = 0.2453$<br>$r_2 = 1.6903$ | $t_1 = 0.089$ |
| | | | | $S_1 = 0.002$ |
| $L_2$ | 1.568 | 34.6 | $r_3 = 0.3244$<br>$r_4 = 0.1722$ | $t_2 = 0.037$ |
| | | | | $S_2' = 0.018$<br>$S_2'' = 0.066$ |
| $L_3$ | 1.568 | 34.6 | $r_5 = -0.1722$<br>$r_6 = -0.3244$ | $t_3 = 0.037$ |
| | | | | $S_3 = 0.001$ |
| $L_4$ | 1.491 | 57.8 | $r_7 = -1.6903$<br>$r_8 = -0.2453$ | $t_4 = 0.089$ |

EXAMPLE 4

| LENS | Nd | V | RADII | THICKNESS (t) AND SPACINGS (S) |
|---|---|---|---|---|
| $L_1$ | 1.491 | 57.8 | $r_1 = 0.2408$<br>$r_2 = 1.2637$ | $t_1 = 0.089$ |
| $L_2$ | 1.568 | 34.6 | $r_3 = 0.2989$<br>$r_4 = 0.1670$ | $S_1 = 0.004$<br>$t_2 = 0.036$ |
| $L_3$ | 1.568 | 34.6 | $r_5 = -0.1670$<br>$r_6 = -0.2989$ | $S_2' = 0.021$<br>$S_2'' = 0.076$<br>$t_3 = 0.036$ |
| $L_4$ | 1.491 | 57.8 | $r_7 = -1.2637$<br>$r_8 = -0.2408$ | $S_3 = 0.004$<br>$t_4 = 0.089$ |

EXAMPLE 5

| LENS | Nd | V | RADII | THICKNESS (t) AND SPACINGS (S) |
|---|---|---|---|---|
| $L_1$ | 1.491 | 57.8 | $r_1 = 0.2388$<br>$r_2 = 1.6178$ | $t_1 = 0.089$ |
| $L_2$ | 1.568 | 34.6 | $r_3 = 0.3168$<br>$r_4 = 0.1668$ | $S_1 = 0.003$<br>$t_2 = 0.036$ |
| $L_3$ | 1.568 | 34.6 | $r_5 = -0.1668$<br>$r_6 = -0.3168$ | $S_2' = 0.036$<br>$S_2'' = 0.048$<br>$t_3 = 0.036$ |
| $L_4$ | 1.491 | 57.8 | $r_7 = -1.6178$<br>$r_8 = -0.2388$ | $S_3 = 0.003$<br>$t_4 = 0.089$ |

EXAMPLE 6

| LENS | Nd | V | RADII | THICKNESS (t) AND SPACINGS (S) |
|---|---|---|---|---|
| $L_1$ | 1.491 | 57.8 | $r_1 = 0.2472$<br>$r_2 = 1.4697$ | $t_1 = 0.089$ |
| $L_2$ | 1.592 | 30.6 | $r_3 = 0.3047$<br>$r_4 = 0.1712$ | $S_1 = 0.007$<br>$t_2 = 0.039$ |
| $L_3$ | 1.592 | 30.6 | $r_5 = -0.1712$<br>$r_6 = -0.3047$ | $S_2' = 0.036$<br>$S_2'' = 0.055$<br>$t_3 = 0.039$ |
| $L_4$ | 1.491 | 57.8 | $r_7 = -1.4697$<br>$r_8 = -0.2472$ | $S_3 = 0.006$<br>$t_4 = 0.089$ |

As an alternative embodiment of the present invention, one or more of the lens surfaces in the photographic objective can be made aspherical to compensate for aberrations. By permitting the lens surface to depart from a purely spherical form, extra variables are provided the lens designer to correct aberrations of the optical system. The use of aspherical surfaces can reduce the spherical, astigmatism, coma flare, aberrations and the value of the Petzval summation. In general, aspherical lens can permit a higher speed and a wider angle.

Aspherical surfaces are most advantageously utilized with injection molded plastics to eliminate polishing and grinding. As known by lens designers, the aspherical surface of the lens can be defined by a power series function in the radial variable as follows:

$$X = \frac{C_o \Phi^2}{1 + (1 - \Sigma C_o^2 \Phi^2)^{1/2}} + \sum_{i=1}^{N} C_i \Phi^{2i} \quad (1)$$

$$\Phi^2 = X^2 + Y^2 \quad (2)$$

Wherein X is the optical axis of the lens; Y is the orthotropic axis, $C_o$ is a zero-order or Gaussian coefficient of the aspheric surface; $C_i \Phi^{2i}$ are the higher order coefficients of the aspheric surface and $\epsilon$ is the eccentricity.

The following examples of conjugate molded plastic lenses are set forth merely as illustrations of the present invention. In each of the following examples, $f = 1.0$, 1:6.5 and the maximum field angle is 46°;

EXAMPLE 7

| LENS | Nd | V | RADII | THICKNESS (t) AND SPACINGS (S) |
|---|---|---|---|---|
| $L_1$ | 1.4914 | 57.8 | $r_1 = 0.2291$<br>$r_2 = 1.3606$ | $t_1 = 0.092$ |
| $L_2$ | 1.5679 | 34.6 | $r_3 = *$<br>$r_4 = 0.1590$ | $S_1 = 0.011$<br>$t_2 = 0.036$ |
| $L_3$ | 1.5679 | 34.6 | $r_5 = -0.1590$<br>$r_6 = *$ | $S_2' = 0.039$<br>$S_2'' = 0.056$<br>$t_3 = 0.036$ |
| $L_4$ | 1.4914 | 57.8 | $r_7 = -1.3606$<br>$r_8 = -0.2291$ | $S_3 = 0.005$<br>$t_4 = 0.092$ |

*ASPHERICAL SURFACE (AS) wherein $C_o = 3.317$
$C_2 = -1.0446$
$\Sigma = 1.0633$ Reference is made to FIG. 8 to disclose a graphic representation of the resulting aberrations.

The following examples 8 and 9 are cited to disclose conjugate lens systems with a number of aspheric surfaces and design parameters taking into account the higher order aberrations. A polycarbonate plastic is utilized for the lenses $L_2$ and $L_3$ in the following example 8.

EXAMPLE 8

| LENS | Nd | V | RADII | THICKNESS (t) AND SPACINGS (S) |
|---|---|---|---|---|
| $L_1$ | 1.491 | 57.8 | $r_1 = AS_1$<br>$r_2 = 1.055$ | $t_1 = 0.092$ |
| $L_2$ | 1.592 | 31.0 | $r_3 = AS_2$<br>$r_4 = AS_3$ | $S_1 = 0.009$<br>$t_2 = 0.040$ |
| $L_3$ | 1.592 | 31.0 | $r_5 = -AS_3$<br>$r_6 = -AS_2$ | $S_2' = 0.037$<br>$S_2'' = 0.050$<br>$t_3 = 0.040$ |
| $L_4$ | 1.491 | 57.8 | $r_7 = -1.055$<br>$r_8 = -AS_1$ | $S_3 = 0.005$<br>$t_4 = 0.092$ |

| | ASPHERICAL SURFACE (AS) | | | |
|---|---|---|---|---|
| | $C_0$ | $C_1$ | $C_2$ | $\Sigma$ |
| $AS_1$ | 4.795 | −0.064 | 0.514 | 1.074 |
| $AS_2$ | 3.086 | −0.049 | −1.885 | 0.875 |

-continued

ASPHERICAL SURFACE (AS)

|     | $C_0$ | $C_1$ | $C_2$ | $\Sigma$ |
|-----|-------|-------|-------|----------|
| $AS_3$ | 6.141 | −0.067 | 2.623 | 1.147 |

EXAMPLE 9

| LENS | Nd | V | RADII | THICKNESS (t) AND SPACINGS (S) |
|------|-----|-----|-------|-------------------------------|
| $L_1$ | 1.491 | 57.8 | $r_1 = AS_1$ | $t_1 = 0.094$ |
|       |       |      | $r_2 = 1.0009$ | |
|       |       |      |                | $S_1 = 0.008$ |
| $L_2$ | 1.584 | 31.0 | $r_3 = AS_2$ | $t_2 = 0.041$ |
|       |       |      | $r_4 = AS_3$ | |
|       |       |      |                | $S_2' = 0.036$ |
|       |       |      |                | $S_2'' = 0.053$ |
| $L_3$ | 1.584 | 31.0 | $r_5 = -AS_3$ | $t_3 = 0.409$ |
|       |       |      | $r_6 = -AS_2$ | $S_3 = 0.005$ |
| $L_4$ | 1.491 | 57.8 | $r_7 = -1.0009$ | $t_4 = 0.094$ |
|       |       |      | $r_8 = -AS_1$ | |

ASPHERICAL SURFACE (AS)

|     | $C_0$ | $C_1$ | $C_2$ | $\Sigma$ |
|-----|-------|-------|-------|----------|
| $AS_1$ | 4.674 | −0.068 | 0.393 | 1.07 |
| $AS_2$ | 3.077 | 0.019 | −0.542 | 0.932 |
| $AS_3$ | 6.176 | −0.090 | 1.643 | 1.143 |

The present invention permits the manufacturing of a relatively inexpensive photographic objective capable of focusing from infinity to portrait distances. The lenses can be produced from only a pair of mold cavities and are advantageously designed to facilitate their assembly into a lens barrel with integral spacers.

The use of plastic provides a relatively inexpensive lens as compared to glass since it removes any grinding or polishing requirements and further provides the lens designer with the ability to control aberrations with one or more aspheric surfaces.

As can be readily appreciated, it is possible to deviate from the above embodiments of the present invention and will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. A lens system adapted for use on a camera comprising in a direction from the object to image side of the lens system, a first positive meniscus lens convex to the object side, a second negative meniscus lens convex to the object side, a third negative meniscus lens of the same shape as the second lens and convex to the image side, a fourth positive meniscus lens of the same shape as the first lens and convex to the image side, the optical axis of each lens being aligned, and means for setting the point of intersection for the principal rays defining the maximum field angle and the optical axis, between the second and third lens, so that the point of intersection is on the second lens side relative to the center of symmetry of the distance between the second and third lenses.

2. The invention of claim 1 wherein the means for setting the point of intersection is an aperture stop located at a point approaching the second lens from the center of symmetry of the second and third lenses whereby the point of intersection for the principal rays defining the maximum field angle and the optical axis is set approximately at the position where the plane of the aperture stop intersects the optical axis.

3. The invention of claim 1 wherein the axial distance between the first and second lenses is equal to that between the third and fourth lenses.

4. The invention of claim 1 wherein the axial distance between the first and second lenses is different from that between the third and fourth lenses.

5. The invention of claim 1 wherein the first and fourth lenses have the same refractive index and the same Abbe number and the second and third lenses have the same refractive index and the same Abbe number.

6. The invention of claim 5 wherein each lens element is made from plastic.

7. The invention of claim 1 wherein at least two of the lens surfaces are aspherical to correct aberrations.

8. A lens system adapted for use on a camera comprising in a direction from object to image a first positive meniscus lens element convex to the object side, a second negative meniscus lens element convex to the object isde, a third negative meniscus lens element of the same shape as the second lens element and convex to the image side, a fourth positive meniscus lens element of the same shape as the first lens element and convex to the image side and an aperture stopper element positioned between the negative lens elements, the optical axis of each element being aligned, the position of the effective plane of the aperture stopper element satisfying the following equation:

$$1.0 \geq \frac{S_2'' - S_2'}{S_2'' + S_2'} > 0.1$$

wherein S is a distance between elements along the optical axis and $S_2'$ is the distance between a surface of the second negative meniscus lens adjacent the third negative lens element and the effective plane of the aperture stopper traverse to the optical axis and $S_2''$ is the distance between the effective plane of the aperture stopper and a surface of the third negative meniscus lens adjacent the second negative lens.

9. The invention of claim 8 wherein each lens element is made from plastic.

10. The invention of claim 8 wherein the first and fourth positive meniscus lens elements are made from glass and the other meniscus lens elements are made from plastic.

11. The invention of claim 10 wherein each positive meniscus lens element has the same thickness and radii of curvature and each lens element is made from plastic.

12. The invention of claim 8 wherein the focal lengths of the positive meniscus lens element, $f_1$ is related to the focal length of the negative meniscus lens element, $f_2$, as follows:

$$1.3 f_1 \geq |f_2|$$

13. The invention of claim 8 wherein the thickness along the optical axis of the positive meniscus lens element, $t_1$, is related to the thickness of the negative meniscus lens element, $t_2$, as follows:

$$t_1 \geq 2t_2$$

14. The invention of claim 1 wherein each positive meniscus lens element has the same thickness and radii of curvature and the lesser radius of curvature on the positive meniscus lens element, $r_1$, is related to the greater radius of curvature on the negative meniscus lens element, $r_3$, as follows:

$$r_1 \leq r_3$$

15. The invention of claim 9 wherein the positive meniscus lens elements are made from methyl methacrylate.

16. The invention of claim 9 wherein the negative meniscus lens elements are made from a copolymer of polystyrene and methyl methacrylate.

17. The invention of claim 9 wherein the positive meniscus lens elements are made from methyl methacrylate and the negative meniscus lens elements have an index of refraction in the range of 1.5 to 1.6 and an Abbe value in the range of 30 to 35.

18. The invention of claim 12 wherein each lens element is made from plastic.

19. The invention of claim 13 wherein each lens element is made from plastic.

20. The invention of claim 14 wherein each lens element is made from plastic.

21. A four element lens system adapted for use on a camera comprising sequentially from the object side to image side of the lens system, a first positive meniscus lens element convex to the object side, a second negative meniscus lens element convex to the object side, a third negative meniscus lens element of the same shape as the second lens element and convex to the image side, a fourth positive meniscus lens element of the same shape as the first lens element and convex to the image side, the optical axis of each element being aligned and means for positioning the principal rays defining the maximum field angle so that their junction with the optical axis satisfies the following equation:

$$1.0 \geq \frac{S_2'' - S_2'}{S_2'' + S_2'} > 0.1$$

the means for positioning being related to the respective adjacent surfaces of the negative lens elements by the distance, $S_2'$, along the optical axis between the surface of the second negative lens element and the junction of the optical axis with the maximum field principal rays and the distance, $S_2''$, between the surface of the third negative meniscus lens and the junction of the optical axis with the maximum field principal rays, the focal length of the first positive lens element, $f_1$, being related to the focal length of the second negative lens element, $f_2$, as follows:

$$1.3 f_1 \geq |f_2|$$

and the thickness along the optical axis of the first positive lens element, $t_1$, being related to the thickness of the second negative lens element, $t_2$, as follows:

$$t_1 \geq 2t_2.$$

22. The invention of claim 21 wherein the first and fourth positive lens elements are the same lens and the second and third negative lens elements are the same lens.

23. The invention of claim 21 wherein the first and fourth positive lens elements have an index of refraction about 1.491 and the second and third negative lens elements have an index of refraction in the range of 1.5 to 1.6.

24. The invention of claim 22 wherein all the lens elements are made from plastic.

25. The invention of claim 23 wherein the second and third negative lens elements have an Abbe value in the range of 30 to 35.

26. The invention of claim 23 wherein the first and fourth positive lens elements are the same shape and the same plastic material and the second and third negative lens elements are the same shape and the same plastic material.

27. The invention of claim 24 wherein the second and third negative lens elements have an Abbe value in the range of 30 to 35 and the first and fourth positive lens elements have an Abbe value of about 57.8.

28. The invention of claim 21 wherein at least two of the lens surfaces are aspherical.

29. A four element lens system having at least one spherical surface (AS) comprising a design parameter of approximate value within the following specification:

| LENS | Nd | V | RADII | THICKNESS (t) AND SPACINGS (S) |
|---|---|---|---|---|
| $L_1$ | 1.4914 | 57.8 | $r_1 = 0.2291$<br>$r_2 = 1.3606$ | $t_1 = 0.092$<br>$S_1 = 0.011$ |
| $L_2$ | 1.5679 | 34.6 | $r_3 = AS_2$<br>$r_4 = 0.1590$ | $t_2 = 0.036$<br>$S_2' = 0.039$<br>$S_2'' = 0.056$ |
| $L_3$ | 1.5679 | 34.6 | $r_5 = -0.1590$<br>$r_6 = -AS_2$ | $t_3 = 0.036$<br>$S_3 = 0.005$ |
| $L_4$ | 1.4914 | 57.8 | $r_7 = -1.3606$<br>$r_8 = -0.2291$ | $t_4 = 0.092$ | wherein (Nd) is the index of refraction, V is the Abbe value and the aspheric surface is defined by an eccentricity $\epsilon$, 1.053 and the following aspherical coefficients; $(C_x)$;

$C_0 = 3.317$
$C_2 = -1.0446$

30. A four element lens having at least some aspherical surface (AS) comprising a design parameter of approximate values within the following specification:

| LENS | Nd | V | RADII | THICKNESS (t) AND SPACINGS (S) |
|---|---|---|---|---|
| $L_1$ | 1.491 | 57.8 | $r_1 = AS_1$<br>$r_2 = 1.055$ | $t_1 = 0.092$<br>$S_1 = 0.009$ |
| $L_2$ | 1.592 | 31.0 | $r_3 = AS_2$<br>$r_4 = AS_3$ | $t_2 = 0.040$<br>$S_2' = 0.037$<br>$S_2'' = 0.050$ |
| $L_3$ | 1.592 | 31.0 | $r_5 = -AS_3$<br>$r_6 = -AS_2$ | $t_3 = 0.040$<br>$S_3 = 0.005$ |
| $L_4$ | 1.491 | 57.8 | $r_7 = -1.055$<br>$r_8 = -AS_1$ | $t_4 = 0.092$ | wherein (Nd) is the index of refraction, V is the Abbe value and the aspheric surfaces are defined respectively by their eccentricities ($\Sigma$) and aspherical coefficients ($C_x$) as follows:

|  | $C_0$ | $C_1$ | $C_2$ | $\Sigma$ |
|---|---|---|---|---|
| $AS_1$ | 4.795 | −0.064 | 0.514 | 1.074 |
| $AS_2$ | 3.086 | −0.049 | −1.885 | 0.875 |
| $AS_3$ | 6.141 | −0.067 | 2.623 | 1.147 |

31. A four element lens having at least some aspherical surfaces (AS) comprising a design parameter of approximate values within the following specification:

| LENS | Nd | V | RADII | THICKNESS (t) AND SPACINGS (S) |
|---|---|---|---|---|
| $L_1$ | 1.491 | 57.8 | $r_1 = AS_1$ | $t_1 = 0.094$ |
|  |  |  | $r_2 = 1.0009$ |  |
|  |  |  |  | $S_1 = 0.008$ |
| $L_2$ | 1.584 | 31.0 | $r_3 = AS_2$ | $t_2 = 0.041$ |
|  |  |  | $r_4 = AS_3$ |  |
|  |  |  |  | $S_2' = 0.036$ |
|  |  |  |  | $S_2'' = 0.053$ |
| $L_3$ | 1.584 | 31.0 | $r_5 = -AS_3$ | $t_3 = 0.409$ |
|  |  |  | $r_6 = -AS_2$ | $S_3 = 0.005$ |
| $L_4$ | 1.491 | 57.8 | $r_7 = -1.0009$ | $t_4 = 0.094$ |
|  |  |  | $r_8 = -AS_1$ |  | wherein (Nd) is the index of refraction, V is the Abbe value and the aspheric surfaces are defined respectively by their eccentricities ( $\Sigma$ ) and aspherical coefficients ($C_x$) as follows:

|  | $C_0$ | $C_1$ | $C_2$ | $\Sigma$ |
|---|---|---|---|---|
| $AS_1$ | 4.674 | −0.068 | 0.393 | 1.070 |
| $AS_2$ | 3.077 | 0.019 | −0.542 | 0.932 |
| $AS_3$ | 6.176 | −0.090 | 1.643 | 1.143 |

32. A four element lens system comprising a first lens having a focal length ($f$) related to a second lens as follows:

$$1.3 f_1 \geq |f_2|$$

and the design parameters of the lenses (L) being within the ranges of the following specification:

| LENS | Nd | V | RADII | THICKNESS (t) AND SPACINGS (S) |
|---|---|---|---|---|
| $L_1$ | ~1.49 | 57.8 | $r_1$ .22 − .25 | $t_1$ ~.09 |
|  |  |  | $r_2$ 1.2 − 1.7 |  |
|  |  |  |  | $S_1$ .002 − .015 |
| $L_2$ | 1.55 − 1.60 | 30 − 35 | $r_3$ .29 − .33 | $t_2$ .03 − .04 |
|  |  |  | $r_4$ .16 − .18 |  |
|  |  |  |  | $S_2'$ .015 − .040 |
|  |  |  |  | $S_2''$ .04 − .08 |
| $L_3$ | 1.55 − 1.60 | 30 − 35 | $r_5$ .16 − .18 | $t_3$ .03 − .04 |
|  |  |  | $r_6$ .29 − .33 | $S_3$ .0005 − .01 |
| $L_4$ | ~ 1.49 | 57.8 | $r_7$ 1.2 − 1.7 | $t_4$ ~.09 |
|  |  |  | $r_8$ .22 − .25 |  | wherein (Nd) is the index of refraction, (V) is the Abbe value, ( ~ ) indicates an approximate value, (−) between numbers indicates an approximate range of values for the appropriate parameter, and $|r|$ indicates an absolute value.

* * * * *